Dec. 25, 1956   A. M. GOODLOE   2,775,445
DAMPENING MEANS FOR LOAD SUPPORTING SPRINGS
Filed Aug. 12, 1955

INVENTOR.
Alfred M. Goodloe,
BY George D. Richards
Attorney

United States Patent Office 2,775,445
Patented Dec. 25, 1956

2,775,445

DAMPENING MEANS FOR LOAD SUPPORTING SPRINGS

Alfred M. Goodloe, Westfield, N. J., assignor to Metal Textile Corporation, Roselle, N. J., a corporation of Delaware Application August 12, 1955, Serial No. 527,998

5 Claims. (Cl. 267—9)

This invention relates to means for frictionally dampening the harmonics of load supporting springs, whereby to prevent excessive resonance vibration thereof so as to bring the same to rest more quickly; said dampening means being especially well adapted for service with large springs used to cushion relatively heavy loads.

This invention has for an object to provide, in combination with a load supporting spring, means to frictionally engage the helices of the spring, whereby to dampen the periodic oscillations of the spring under load.

The invention has for a further object to provide a novel construction of dampening elements disposed in circumferentially spaced relation externally around a load supporting spring body, and substantially parallel to the spring body axis, whereby to frictionally engage the helices of the spring body, and including means to encircle said dampening elements so as to thrust the same radially inward into said frictional engagement with the spring body; such relation of said dampening elements to the spring body being adapted to permit axial up and down movement of the latter responsive to load, while nevertheless also permitting lateral play thereof without impairing the dampening effect of said dampening elements.

Another object of the invention is to provide dampening elements with friction producing means comprising resilient pads formed from compressed or compacted knitted or woven wire mesh.

The above and other objects will be understood from a reading of the following description of this invention in connection with the accompanying drawings, in which.

Figure 1:
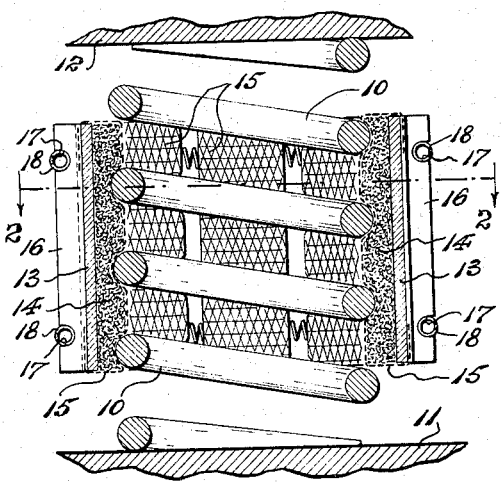
Fig. 1 is a vertical longitudinal sectional view of a load supporting spring equipped with dampening means according to this invention.
Figure 2:
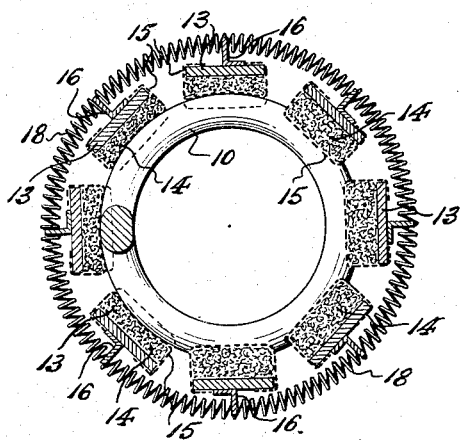
Fig. 2 is a horizontal sectional view of the same, taken on line 2—2 in Fig. 1.

Referring to the drawings, in which like characters of reference indicate corresponding parts, the reference character 10 indicates a cylindrical helical spring body adapted to be footed upon a suitable stationary support 11 so that its upper end supports a load 12.

The dampening means of this invention comprises a plurality of friction inducing dampener elements which are disposed around the external periphery of the spring body 10, in circumferentially spaced apart relation parallel to the axis of said spring body, and so as to engage and bridge across the helices of said spring body. Each said dampener element comprises a stave structure provided by a backing plate 13, of suitable width and of less length than the length of the spring body, the same being produced from metal or other suitable rigid material. Affixed to the front or inner face of the backing plate 13, in covering relation thereto, is a resiliently compressible pad 14 formed from a mass of compressed and compacted knitted or woven wire mesh. Said resiliently compressible pad of compressed and compacted knitted or woven wire mesh is of general type and can be produced substantially in the manner disclosed in prior Letters Patent No. 2,334,263 to Hartwell or No. 2,462,316 to Goodloe, whereby contiguous piles and folds of wire mesh fabric are collapsed upon themselves into compacted intertangled and interlocked relation forming a relatively dense body mass which possesses substantial compressible elasticity. Preferably, the pad 14 is enclosed in a retaining jacket 15, comprising a knitted wire open mesh fabric. Said jacket is suitably secured or anchored to the backing plate 13 (see Figs. 1 to 4 inclusive), so as to enclose the exposed surface areas of the pad. Said jacket 15 may, however, be omitted (see Fig. 5), and the resilient pad 14 may be otherwise retained in connection with the backing plate 13, as e. g. by soldering, cementing or spot welding the same to the latter. Mounted on the rear or outer face of the backing plate 13, as a unitary part thereof, is a longitudinally extending flange or rib 16, which projects outwardly therefrom in a plane perpendicular thereto. The external marginal portion of said flange or rib 16 is provided with longitudinally spaced apart, indenting seating notches 17.

As shown (see Fig. 2 more particularly), a plurality of dampener elements are assembled, in circumferentially spaced apart relation, around the exterior of the spring body 10, so that their resiliently compressible metallic pads 14 bridge across the helices of said spring body. In order to thrust said dampener elements inwardly, so as to engage their compressible metallic pads 14 with the helices of the spring body, a plurality of longitudinally spaced apart circular or endless garter springs 18 are disposed to encircle the assembly of said dampener elements, and are retained in operative relation to the latter by seating the same in and across the seating notches 17, with which the external flanges or ribs 16 of said dampener elements are provided. The contractual tension of said garter springs 18 exerts radially directed, inward thrust upon the dampener elements, whereby the resiliently compressible metallic pads 14 thereof are firmly pressed against the helices of the spring body, so as to be somewhat indented by the latter, and thus producing a snubbing relation of said pads to the spring board helices, which induces substantial friction therebetween. The friction thus induced, while not great enough to prevent normal reaction of the spring body to a load supported thereby, is nevertheless sufficient to resist and restrain harmonics or undue periodic oscillations of the spring body under load, so that the spring body comes more quickly to rest after moments of axial movement under load.

It will be understood that the degree of dampening effect of the dampener elements can be regulated by predetermining or varying the tension of the garter springs 18.

Owing to the circumferentially spaced disposition of the dampener elements, as assembled with and around the spring body, the latter is not only free for normal axial or up and down movement under load, but the spring body is also free for lateral play or excursion in any direction, since the individual dampener elements will readily yield outwardly at any point and direction where such lateral play or excursion of the spring body may occur.

Figure 5:
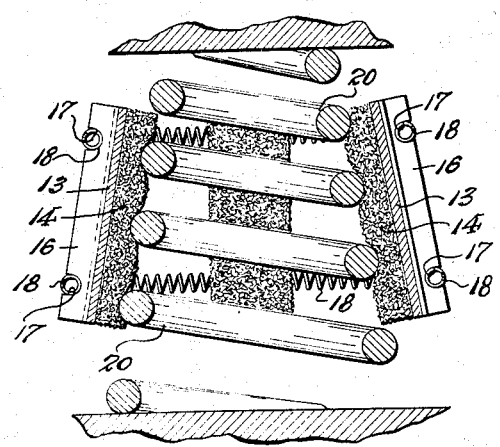
Fig. 5 is a vertical longitudinal sectional view of a conical type load supporting spring equipped with the dampening means of this invention.
Figure 3:
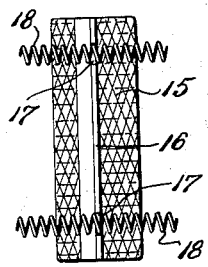
Fig. 3 is a rear or outer face view of a dampening element according to this invention.
Figure 4:
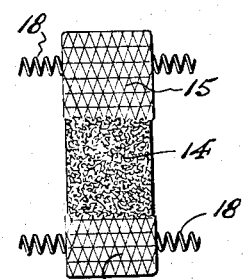
Fig. 4 is a front or inner face view of the same, with parts broken away.

Another advantage of the stave formation of the dampener elements, as circumferentially spaced around a spring body, is that such assembly thereof can also be easily and effectively applied to a conical spring body, such as indicated by the reference character 20 in Fig. 5, as well as to a cylindrical spring body. In such case, the assembly of dampener elements readily conforms itself to the angular or inclined contour of the conical spring body shape, and will be operatively held in conforming relation to such spring body by the spaced garter springs 18.

Having now described my invention, I claim:

1. In combination, a load supporting spring and dampening means therefor, said dampening means comprising a plurality of dampener elements disposed in circumferentially spaced relation externally around the spring body substantially parallel to the axis of the latter, each dampener element comprising a rigid back plate, a resiliently compressible pad provided by a compressed and compacted molded body of metallic wire fabric mounted on the inner face of said back plate to bridge across the helices of the spring body, and means to thrust said dampener elements radially inward, whereby to frictionally engage the pads thereof with the helices of the spring body.

2. In combination, a load supporting spring and dampening means therefor, said dampening means comprising a plurality of dampener elements disposed in circumferentially spaced relation externally around the spring body substantially parallel to the axis of the latter, each dampener element comprising a rigid back plate, a resiliently compressible pad provided by a compressed and compacted molded body of metallic wire fabric mounted on the inner face of said back plate to bridge across the helices of the spring body, and said latter means comprising tensionally contractible garter spring means disposed to encircle the assembly of dampener elements.

3. In combination, a load supporting spring and dampening means therefor, said dampening means comprising a plurality of dampener elements disposed in circumferentially spaced relation externally around the spring body substantially parallel to the axis of the latter, each dampener element comprising a rigid back plate, a resiliently compressible pad provided by a compressed and compacted molded body of metallic wire fabric mounted on the inner face of said back plate to bridge across the helices of the spring body, and said back plate having a longitudinal rib projecting from the outer face thereof, and said rib having longitudinally spaced seating notches in its outer marginal portion, and means to thrust said dampener elements radially inward, whereby to frictionally engage the pads thereof with the helices of the spring body, said latter means comprising tensionally contractible circular garter springs supported by and across corresponding seating notches, of the back plate ribs so as to embrace the assembly of dampener elements.

4. In combination, a load supporting spring and dampening means therefor, said dampening means comprising a plurality of dampener elements disposed in circumferentially spaced relation externally around the spring body substantially parallel to the axis of the latter, each dampener element comprising a rigid back plate of substantial width and of length less than the height of the spring body, a resiliently compressible pad provided by a compressed and compacted molded body of metallic wire fabric mounted on the inner face of said back plate to bridge across the helices of the spring body, a jacket of metallic wire fabric affixed to said back plate whereby to envelop said pad, and means to thrust said dampener elements radially inward, whereby to frictionally engage the pads thereof with the helices of the spring body.

5. In combination, a load supporting spring and dampening means therefor, said dampening means comprising a plurality of dampener elements disposed in circumferentially spaced relation externally around the spring body substantially parallel to the axis of the latter, each dampener element comprising a rigid back plate of substantial width and of length less than the height of the spring body, a resiliently compressible pad provided by a compressed and compacted molded body of metallic wire fabric mounted on the inner face of said back plate to bridge across the helices of the spring body, a jacket of metallic wire fabric affixed to said back plate whereby to envelop said pad, said back plate having a longitudinal rib projecting from the outer face thereof, and said rib having longitudinally spaced seating notches in its outer marginal portion, and means to thrust said dampener elements radially inward, whereby to frictionally engage the pads thereof with the helices of the spring body, said latter means comprising tensionally contractible circular garter springs supported by and across corresponding seating notches of the back plate ribs so as to embrace the assembly of dampener elements.

References Cited in the file of this patent

UNITED STATES PATENTS

| 1,928,678 | Sjolander | Oct. 3, 1933 |
| 1,952,102 | Sproul | Mar. 27, 1934 |
| 2,744,718 | Markowski et al. | May 8, 1956 |

FOREIGN PATENTS

| 589,583 | France | Feb. 25, 1925 |
| 690,933 | Germany | May 11, 1940 |